P. BOGEY.
GRINDING MACHINE.
APPLICATION FILED JUNE 17, 1911.
1,088,872.
Patented Mar. 3, 1914.
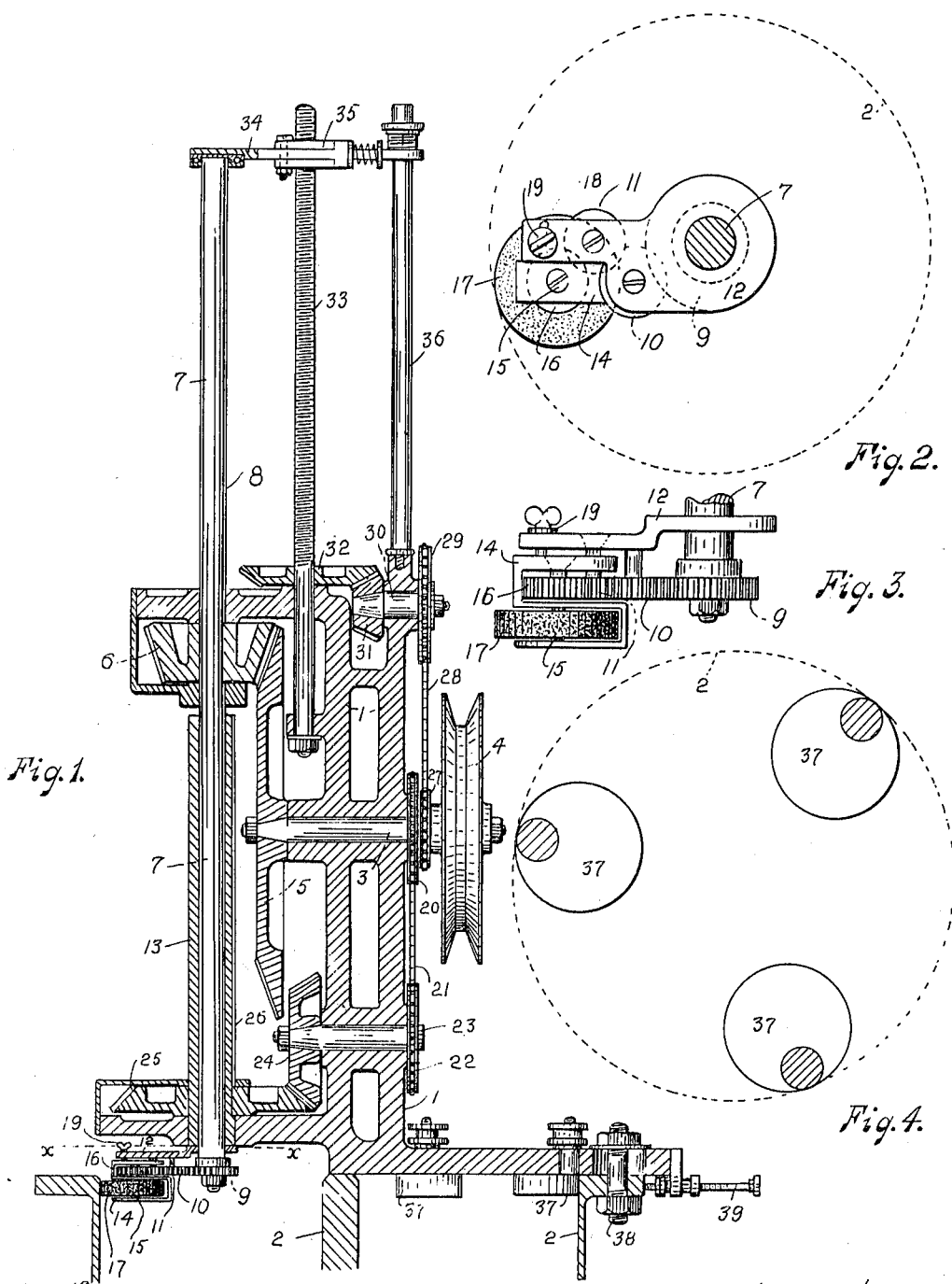
Witnesses:
Jesse P. Eoff
E. P. Remond
Inventor:
Pierre Bogey

UNITED STATES PATENT OFFICE.

PIERRE BOGEY, OF SAN FRANCISCO, CALIFORNIA.

GRINDING-MACHINE.

1,088,872.  Specification of Letters Patent.  Patented Mar. 3, 1914.

Application filed June 17, 1911. Serial No. 633,843.

*To all whom it may concern:*

Be it known that I, PIERRE BOGEY, a citizen of France, residing in the city and county of San Francisco and State of California, have invented certain new and useful Improvements in Grinding-Machines.

This invention relates to an improved machine for regrinding the cylinders of automobile engines and the like.

The object of this invention is to provide a machine which, while being readily and quickly attached to the cylinder to be reground, can be operated by the ordinary mechanic usually found in the automobile repair shops of this country.

Another object of the invention is to provide an improved machine of the character stated of low cost and which can be moved from place to place in the shop.

These objects are accomplished by means of the device illustrated in the accompanying drawing, in which:—

Figure 1 is a vertical cross section. Fig. 2 is a plan section on line X X of Fig. 1. Fig. 3 is a side elevation of Fig. 2. Fig. 4 is a plan section of the cams for centering the machine in the companion cylinder of the engine.

The machine consists of the frame 1 suitably arranged so as to be easily attached to the cylinder 2 of a gas engine. Journaled in the frame 1 is the main driving shaft 3 provided with a pulley 4 adapted to receive its power from any suitable source of power. On the shaft 3 is secured a bevel gear 5 arranged to mesh with a bevel gear 6 secured on a spindle 7 by means of a keyway 8 to allow a downward movement of the spindle. The spindle 7 is journaled in the frame 1 at right angles to the shaft 3. The spindle 7 is provided on its lower end with a gear 9 engaging with a train of gears 10 and 11. The gears 10 and 11 are journaled in a plate 12 which is securely fastened to a sleeve 13 surrounding the spindle 7. Pivotally secured to the plate 12 is a plate 14 provided with a shaft 15 upon which is journaled a gear 16 adapted to mesh with gear 11. On the shaft 15 is also secured a suitable emery or carborundum wheel 17. The plate 12 is provided with a slot or groove 18 through which passes a locking device 19 to securely hold plate 14 with its emery wheel 17 in any desired position.

Upon the shaft 3 is a sprocket wheel 20 connected by a suitable chain 21 to another sprocket wheel 22 on one end of a shaft 23 which is also journaled in the frame 1. On the other end of the shaft 23 is a bevel gear 24 meshing with a bevel gear 25 which is slidably connected to sleeve 13 by means of a slot 26 which allows the sleeve to move up or down. On the shaft 3 is also located another sprocket wheel 27 connected by a chain 28 to a sprocket 29 secured to a shaft 30 also journaled in the frame 1. On the inner side of the shaft 30 is secured a bevel gear 31 engaging with a gear 32 secured on a screw spindle 33.

The upper end of spindle 8 is provided with an arm 34 having a nut 35 engaging with the screw spindle 33. This nut is so arranged that it can be readily disengaged from the screw spindle 33. The other end of the arm 34 slides on a suitable guide 36 which is connected to the frame 1.

The lower side of the frame 1 is provided with a set of cams 37 for centering the device in the companion cylinder of the engine. There is also provided suitable bolts 38 and a set screw 39 for holding, adjusting and centering the machine in the cylinder to be reground.

The operation of the device is as follows:—The machine is securely fastened to the face of the cylinder and is centered by means of the cams 37, bolts 38, and set screw 39. The emery wheel 17 is adjusted to the diameter of the cylinder to be reground by means of the locking device 19. Rotary motion is then given the drive pulley 4 which, by means of the bevel gears 5 and 6, spindle 7 and train of gears 9, 10 and 11, rotates the emery wheel at a very high rate of speed against the side of the cylinder. At the same time by means of the sprockets 20 and 22 and gears 24 and 25, the sleeve 13 is rotated around the spindle 7 at a much slower speed carrying with it the plate 12 with its gears and the emery wheel 17, against the inside walls of the cylinder. Downward longitudinal movement is given the spindle 7 with its sleeve 13 by means of arm 34 with its nut 35 engaging with screw spindle 33 which is rotated by means of the bevel gears 31 and 32 and sprockets 27 and 29. When the emery wheel has reached the bottom of the cylinder, the nut 35 is disengaged from the screw spindle 33 and the wheel is raised and the operation repeated.

It will be seen that by means of the apparatus described that very accurate work can be performed, the whole device being fastened to the bottom face of the cylinder which is always at right angles to the walls of the cylinder. The machine being readily adjusted to any size cylinder and easily handled; it is particularly adapted for use in small repair shops.

Having now described my invention, what I claim as new and desire to secure by Letters Patent is:—

1. In a grinding machine for engine cylinders or the like, the combination of an elongated spindle, a transversely extending rotatable drive shaft, intermeshing gears mounted on the drive shaft and spindle for rotating the spindle, a rotary grinding wheel mounted on a suitably supported shaft extending longitudinally of the spindle and to one side of the spindle, a sleeve surrounding the spindle operatively connected with the grinding wheel support, means for rotating the sleeve including a gear mechanism operatively connected with said drive shaft, and means for imparting lengthwise movement to the spindle and with it the grinding wheel and its driving gear.

2. In a grinding machine for engine cylinders or the like, the combination of an elongated spindle, a transversely extending rotatable drive shaft, intermeshing gears mounted on the drive shaft and spindle for rotating the spindle, a rotary grinding wheel mounted on a suitably supported shaft extending longitudinally of the spindle and to one side of the spindle, a sleeve surrounding the spindle operatively connected with the grinding wheel support, means for rotating the sleeve including a gear mechanism operatively connected with said drive shaft and means for imparting lengthwise movement to the spindle and with it the grinding wheel and its driving gear comprising a vertically extended feed screw operatively connected at one end to said spindle, and a gear connection between said screw and said drive shaft.

3. In a grinding machine for engines or the like, the combination of an elongated spindle, a drive shaft, gearing between said drive shaft and spindle for rotating the spindle, a sleeve loosely mounted on said spindle and longitudinally movable therewith, a grinding wheel support carried by said sleeve, a grinding wheel journaled in said support, gearing between said grinding wheel and said spindle, gearing between said sleeve and the drive shaft for rotating said sleeve, and means for feeding the spindle and sleeve carried thereby longitudinally.

4. In a grinding machine for engines or the like the combination of an elongated spindle, a drive shaft, gearing between said drive shaft and spindle for rotating the spindle, a sleeve loosely mounted on said spindle and longitudinally movable therewith, a grinding wheel support carried by said sleeve, a grinding wheel journaled in said support, gearing between said grinding wheel and said spindle, gearing between the sleeve and the drive shaft for rotating said sleeve, and means actuated by the drive shaft for feeding said spindle and the sleeve carried thereby, said means comprising a feed screw arranged parallel to the spindle, a nut carried by said spindle and having a threaded engagement with said feed screw, and gearing for rotating the feed screw from the drive shaft.

PIERRE BOGEY.

Witnesses:
 Jesse R. Eoff,
 Jos. H. Ridgeway.